United States Patent [19]

Kojima et al.

[11] Patent Number: 5,305,602
[45] Date of Patent: Apr. 26, 1994

[54] DEVICE FOR CATCHING AND REMOVING PARTICULATES FOR A DIESEL ENGINE

[75] Inventors: Akikazu Kojima, Gamagori; Shinji Miyoshi; Mitsuo Inagaki, both of Okazaki, all of Japan

[73] Assignee: Nippon Soken, Inc., Nishio, Japan

[21] Appl. No.: 924,882

[22] Filed: Aug. 6, 1992

[30] Foreign Application Priority Data

Aug. 9, 1991 [JP] Japan .................... 3-200482

[51] Int. Cl.$^5$ ............................................. F01N 3/10
[52] U.S. Cl. ......................... 60/286; 55/283; 55/466; 55/DIG. 30; 60/288
[58] Field of Search ............ 60/286, 288, 303; 55/466, 283, DIG. 30

[56] References Cited

U.S. PATENT DOCUMENTS

| | | | |
|---|---|---|---|
| 4,450,682 | 5/1984 | Sato | 60/286 |
| 4,589,254 | 5/1986 | Kume et al. | |
| 4,615,173 | 10/1986 | Usui et al. | |
| 4,875,336 | 10/1989 | Hayashi et al. | |
| 5,090,200 | 2/1992 | Arai | |
| 5,105,619 | 4/1992 | Arai | |

FOREIGN PATENT DOCUMENTS

| | | |
|---|---|---|
| 0383187 | 8/1990 | European Pat. Off. |
| 0389891 | 10/1990 | European Pat. Off. |
| 3900532 | 7/1989 | Fed. Rep. of Germany |
| 58-180715 | 10/1983 | Japan |
| 2-256813 | 10/1990 | Japan |

*Primary Examiner*—Douglas Hart
*Attorney, Agent, or Firm*—Cushman, Darby & Cushman

[57] ABSTRACT

A device for removing for particulates a diesel engine having a filter arranged in the flow of the exhaust gas, a heater for heating the filter, and an air pump or obtaining a flow of air for incineration of the particulates trapped by the filter when it is clogged. The amount of the air for the incineration of the filter is calculated in accordance with the amount of the particulates remaining in the filter at the peripheral zone thereof just after the preceding incineration cycle.

7 Claims, 11 Drawing Sheets

5,305,602

DEVICE FOR CATCHING AND REMOVING PARTICULATES FOR A DIESEL ENGINE

BACKGROUND OF THE INVENTION

1. Field of the Invention

The present invention relates to a device arranged in a exhaust pipe of a diesel engine for catching and removing particulates in the exhaust gas.

2. Description of the Related Art

Exhaust gas from a diesel engine includes particulates made of carbon etc. There are now strong regulations for eliminattion of these before discharge of the exhaust gas to the atmosphere. In order to eliminate particulates, use is made of a filter made of a ceramic material of, for example, a honeycomb structure having a plurality of axially extending cells with upstream and downstream ends which are alternately opened and closed. The cells have porous walls. Exhaust gas from cells having open upstream ends and closed downstream ends thus passes to the cells having closed upstream ends and open downstream ends. The particulates in the exhaust gas are thus trapped by the porous walls. The porous walls, however, become clogged the longer the filter is used. This causes an increased pressure loss between the inlet and the outlet of the filter. To renew the filter, a heater is provided in the casing of the filter device. This is energized when a renewing operation is necessary and causes the particulates clogged in the filter to be incinerated and eliminated.

During the incinerating process, the temperature at the center portion of the filter is much higher than at the outer peripheral portion. In order to prevent the filter from being thermally damaged, the temperature of the filter must not exceed an upper limit temperature such as 900° C. In this case, the temperature of the filter at the outer peripheral portion is at most 500 ° C., which is usually insufficient to fully incinerate the clogged particulates. As a result, along the outer periphery of the filter, particulates remain without being incinerated, which causes the effective area of the filter to be reduced. This reduction in the effective area of the filter increases the speed of the air used for the following incineration process-making it too high so that the ideal incineration process can not be obtained. This in turn increases the amount of particulates remaining without being incinerated. As a result, the more incineration cycles, the larger the amount of the particulates not eliminated.

SUMMARY OF THE INVENTION

An object of the present invention is to provide an improved construction of a device for catching and removing particulates which is capable of overcoming the above-mentioned drawback in the prior art.

According to the present invention, a device for catching and removing particulates in exhaust gas in a diesel engine is provided, the apparatus comprising:

a filter arranged in an exhaust line for receiving the exhaust gas from the diesel engine, the filter being capable of trapping particulates including the exhaust gas;

heating means arranged adjacent the filter for generating heat in the filter;

means for supplying air into the filter for incinerating the particulates, and means for controlling the amount of the air flow for obtaining a desired incineration performance of the particulates trapped in the filter.

By controlling the amount of the air, one can maintain the optimum incineration condition for the particulates trapped in the filter, which is effective for obtaining an ideal trapping operation of particulates even if the incineration process is repeated a substantial number of the.

DESCRIPTION OF THE PREFERRED EMBODIMENTS

Figure 1:
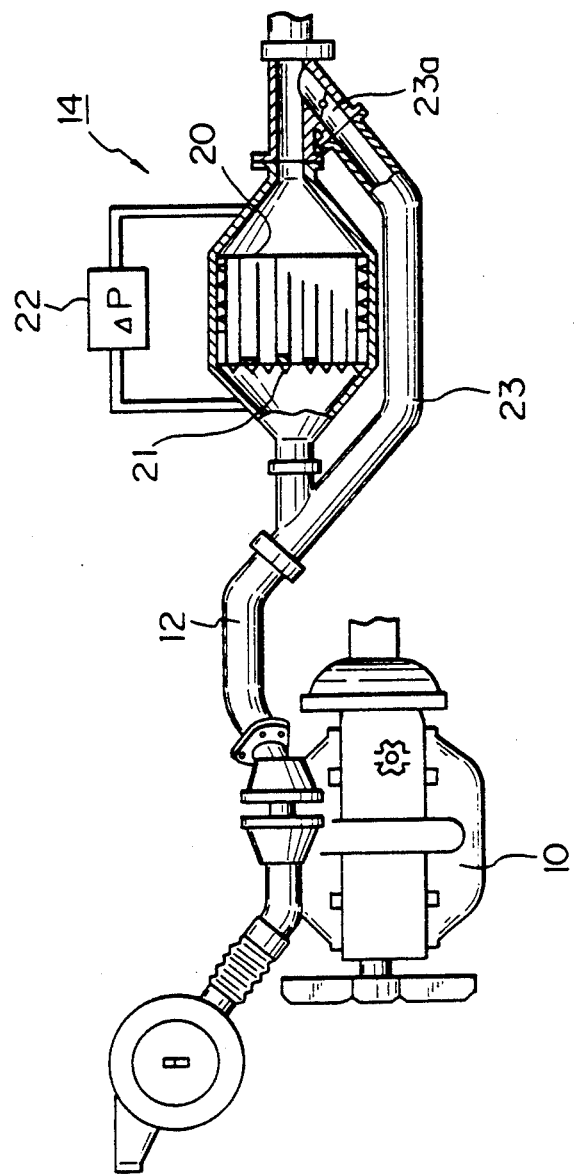
FIG. 1 schematically shows a prior art trapping device.

The problem to be solved by the present invention will be explained with reference to FIGS. 1 and 2. In FIG. 1, reference numeral 10 denotes a diesel engine. An exhaust pipe 12 is connected to the engine 10 for receiving the exhaust gas therefrom. A device 14 for removing particulates in the exhaust gas is arranged in the exhaust pipe 12. The device 14 is constructed by a filter 20 for catching the particulates in the exhaust gas, a heater 21 arranged adjacent to an upstream end of the filter 20 for incinerating the particulates held in the filter 20, a detector 22 for detection of a pressure difference across the filter 20 in the direction of the flow of the exhaust gas through the filter 20, and a by-pass passageway 23 which is usually closed, but is opened for by-passing the filter 20 when the filter 20 is subjected to an incinerating operation for incineration.

Figure 2:
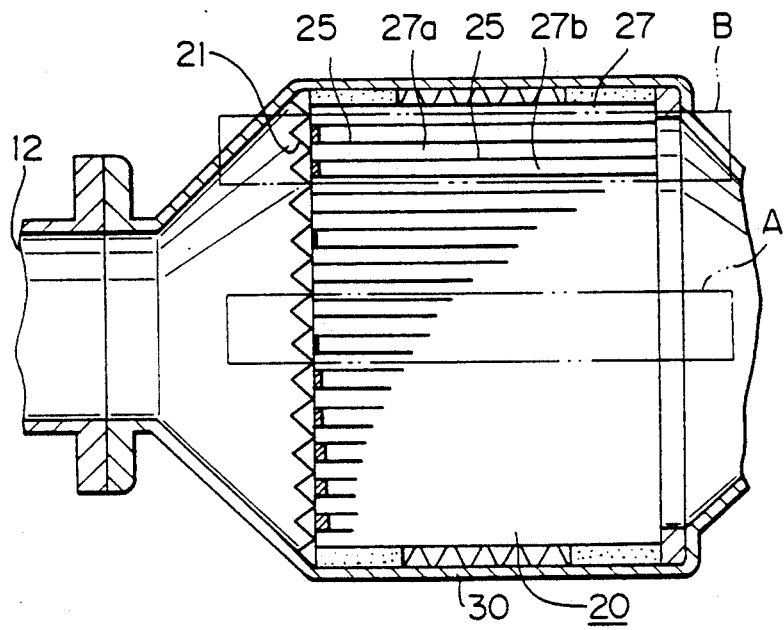
FIG. 2 shows a longitudinal cross sectional view of a trapping device in the prior art.

As shown in FIG. 2, the filter 20 is made of a honeycomb structure of a ceramic material such as cordierite. It has a plurality of cells 27 partitioned by porous walls 25, each of which cells 27 is elongated in the direction of the axis of the filter 20. Among adjacent axially elongated cells, the cells 27a have an open upstream end and a closed downstream end, and the cells 27b have a closed upstream end and an opened downstream end. The exhaust gas is introduced into the open upstream ends of the cells 27a, radially passes through the porous partition walls 25 to be introduced into the adjacent cells 27b, and exits from the filter via the opened downstream ends of the cells 27b. When the exhaust gas radially passes through the porous partition walls 25, the particulates are trapped at the porous walls 25.

As the particulates collect on the porous walls 25, i.e., the filter 20 is clogged by the particulates, the pressure difference $\Delta P$ between the inlet and outlet of the filter 20 is increased, which causes the output of the engine 10 to be decreased. In order to eliminate this problem, a sensor 22 is provided for detection of the pressure difference $\Delta p$ between the inlet and outlet of the filter 20. The timing for incineration of the filter is determined by when the pressure difference becomes larger than a predetermined value. The heater 21 is then energized for commencing the incineration operation. It should be noted that, during the incineration operation, a valve 23a is opened so that the exhaust gas from the engine 10 passes through the by-pass passageway 23 and by-passes the filter 20.

Figure 3:
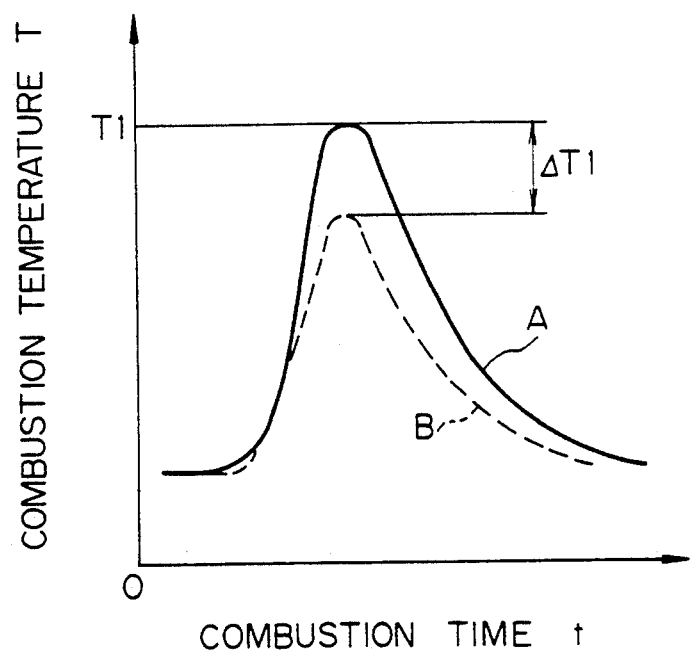
FIG. 3 shows the relationship of the combustion temperature of particulates during their incineration with respect to the elapse time after commencing the incineration process.
Figure 4:
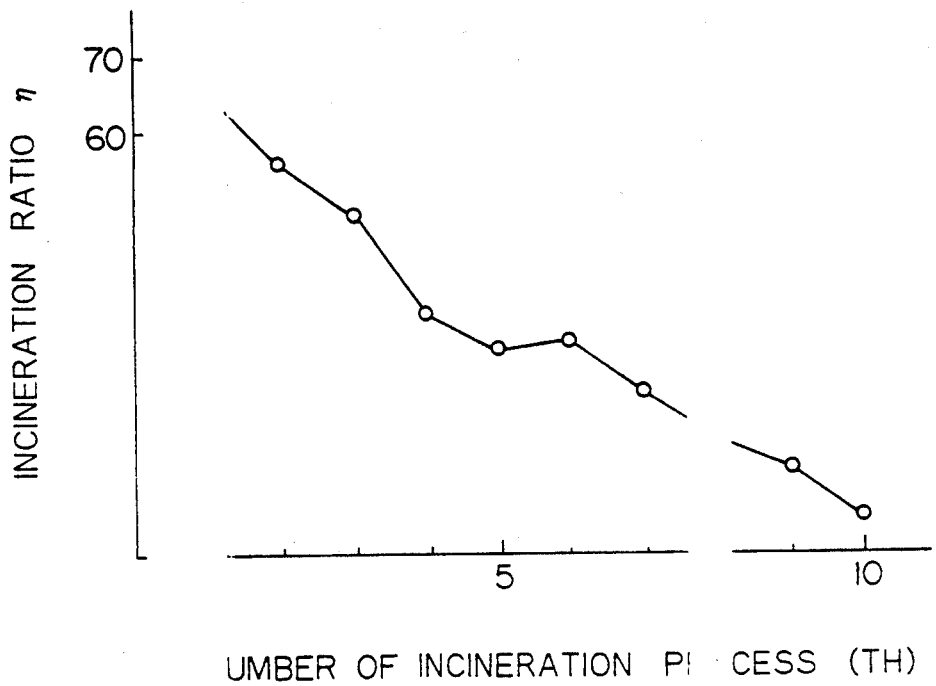
FIG. 4 shows the relationship between the number of incineration processes and a incineration ratio $\eta$ in the prior art.

In the prior art construction, in FIG. 3 the curve A shows the relationship between the elapse of time during an incineration process of the filter and the combustion temperature at the central portion of the filter 20, and the curve B shows a similar relationship at an outer peripheral part of the filter 20. As will be easily seen, there is a large difference $\Delta T1$ in the combustion temperature between the center portion and the peripheral portion. The low temperature as shown by the curve B at the peripheral part of the filter 20 is caused by the fact that heat at the outer peripheral portion of the filter 20 is lost to the outside via the casing 30. Contrary to this, at the central portion A of the filter, the combustion heat is maintained without being dissipated. It is well known that the temperature difference $\Delta T1$ between the center portion A and the peripheral portion B may be sometimes as high as 400° C. As well known to those skilled in this art, the temperature at the central part A of the filter 20 must be no more than about 900° C. In this case, the temperature at the peripheral part is at most about 500° C., which causes, sometimes, the particulates held in the filter at the peripheral region to be incompletely incinerated, resulting in a decrease in the amount of the particulates incinerated after repeated incineration processes. FIG. 4 shows the relationship in a prior art device between the number of the incineration cycles and a incineration ratio $\eta$ of the amount of the particulates incinerated to the amount of the particulates included in the filter before an incineration operation. As is easily seen, the greater the number of the incineration operations the lower the incineration ratio $\eta$, due to the fact that the amount of particulates held at the peripheral area of the filter without being incinerated is increased.

Figure 5:
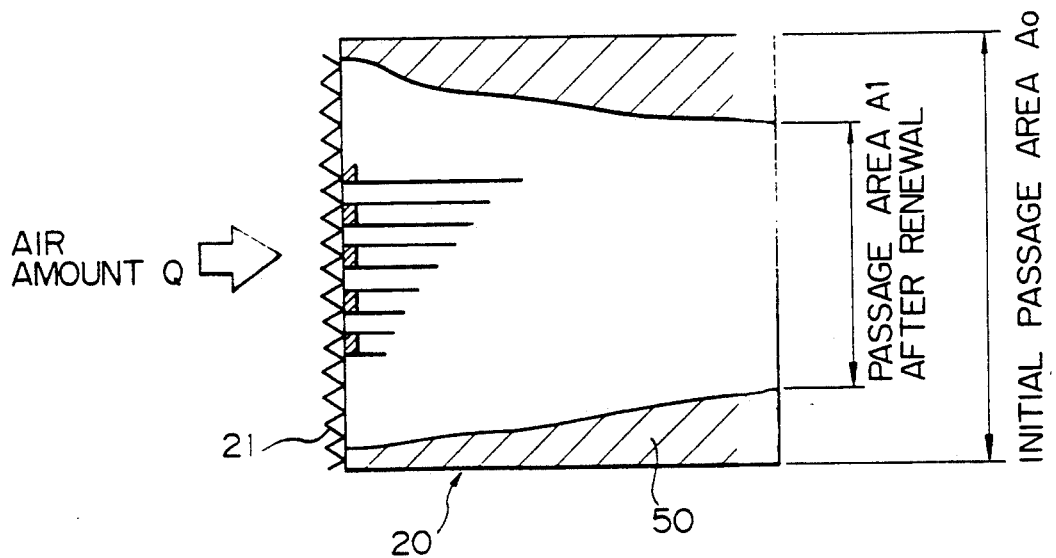
FIG. 5 is a longitudinal cross-section of a trapping device after completion of one incineration process.

The approach taken by the invention to eliminate the above-mentioned problem in the prior art will now be explained. FIG. 5 schematically illustrates how the remaining particulates are located in the filter 20 after completion of a incineration operation. As will be seen from FIG. 5, the nonincinerated particulates occupy the outer peripheral zone 50 of the filter where the temperature during the incineration process was low. Nearer the downstream end of the filter, the thickness of the deposited particulates becomes larger. As a result, the effective thickness of the filter after the repeated incineration process is A1, which is smaller than the original diameter A0 of the filter. Therefore, there is a reduction in the effective area, which corresponds to A0-A1, which increases the resistance in the flow of air during the incineration process, causing the amount of nonincinerated particulates to be increased. Namely, given a constant value of the volume Q of the combustion air during the incineration process, a reduction in the effective area from A1 to A0 increases the speed of the air to the usual speed multiplied by A0/A1. This increase robs heat from the heater or the heat of combustion of the particulates, which causes the amount of unburnt particulates to be increased further.

Figure 6:
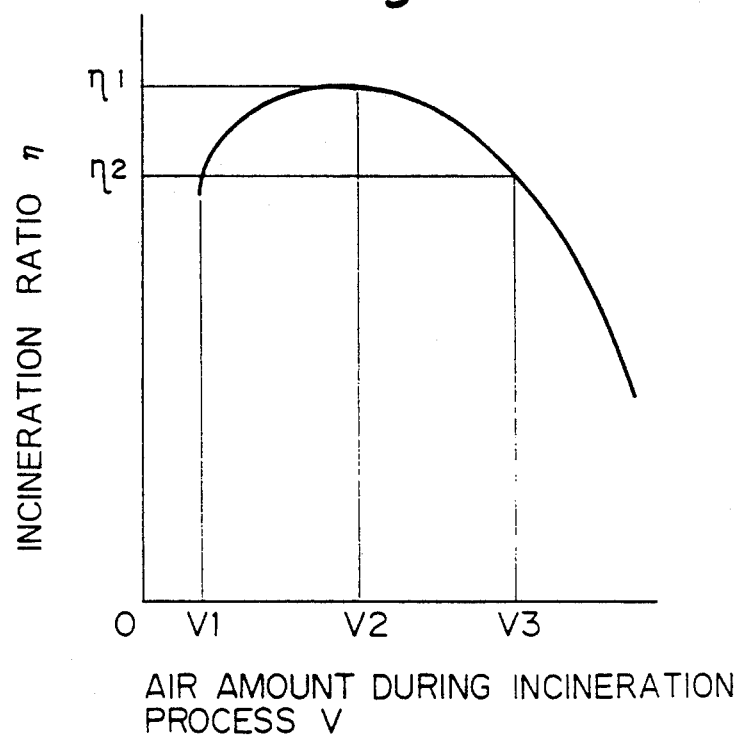
FIG. 6 shows the relationship between the air speed at a incineration process and a incineration ratio $\eta$.

FIG. 6 shows the relationship of the speed of the combustion air V of the incineration process with the incineration ratio $\eta$. As is easily seen from FIG. 6, the incineration ratio $\eta$ is highly influenced by the speed V of the combustion air during the incineration process. Namely, during the increase in the speed V from the value V1, the ratio $\eta$ increases, reaches its maximum value $\eta1$ at the value V2 of the air flow speed, and then decreases. For example, at the gas speed V3, the ratio $\eta$ has a decreased value of $\eta2$. In the prior art device, the air speed is fixed to V2 to obtain the maximum ratio $\eta1$ when the effective area is A0. However, the formation of the nonincinerated area 50 causes the air speed to be increased to the V3 value due to the decrease in the flow area from A0 to A1. The value of V3 is equal to the value of V2 multiplied by the air flow Q/flow area A1 after the incineration process, causing the ratio $\eta$ to be decreased to $\eta2$. This is the nonincinerated are to be increased and causes the air speed to be increased further. This means that the more the incineration process is repeated, the bigger the nonincinerated area 50, which decreases the effective flow area further The repetition of this process finally cause the filter to be completely clogged, causing the back pressure to be increased. Notice of this fact has caused the idea of the present invention.

Figure 7:
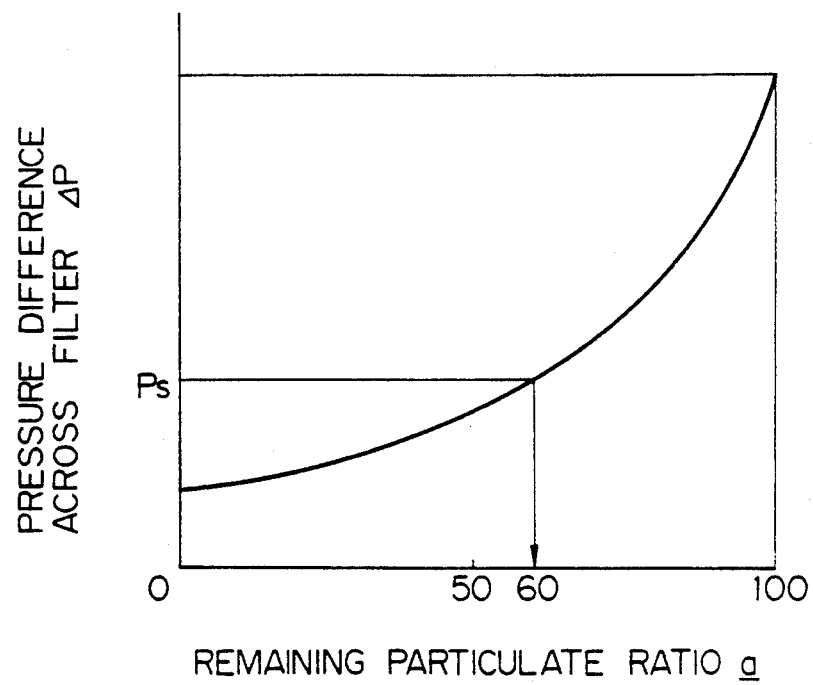
FIG. 7 shows the relationship between the remaining particulate ratio a and a value of the pressure difference $\Delta P$ across the filter in the direction of the flow of the exhaust gas.
Figure 8:
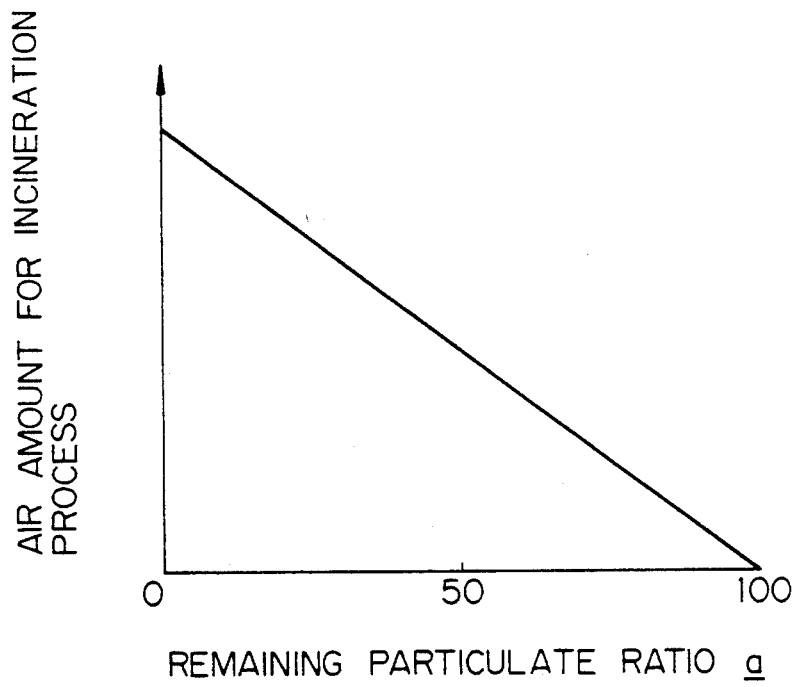
FIG. 8 shows the relationship between the remaining particulate ratio a and the air flow amount for a incineration process.

The desired amount of air for incineration depends on the amount of the particulates remaining nonincinerated in the filter at the outer peripheral area 50 after the completion of one cycle of the incineration process. Namely, the more particulates remaining at the peripheral area, the lower the effective area A of the filter usable for trapping the particulates at the following cycle. The value of the effective area just after the preceding incineration process can be estimated from the pressure difference $\Delta P$ across the filter in the direction of the flow of the exhaust gas. As shown in FIG. 8, the larger the remaining particulate ratio a (ratio of the area A1 of the portion of the filter with no particulates to the original area A0), the higher the pressure drop $\Delta P$ when commencing the next incineration cycle. The pressure loss $\Delta P$ makes it possible to estimate the effective area just after the completion of the previous incineration cycle. The smaller the effective area, the smaller the amount of air Q for obtaining the ideal incineration ratio. The relationships in FIGS. 7 and 8 give the desired value of air amount Q for obtaining the maximum incineration ratio $\eta1$ in FIG. 6.

Next, an embodiment of the present invention will be explained with reference to FIG. 9. In this embodiment, a diesel engine has an exhaust pipe 100, in which a particulate trapping device 112 is arranged. The particulate trapping device 112 is provided with a tubular casing 114 having inlet and outlet ends 116 and 118 which taper to the outside. A filter 120 is arranged in the casing 114. The filter has an outer diameter of about 140 mm and of a length of about 130 mm, thereby obtaining a volume of about 2 liters. Inside the casing 114, downstream from the filter 120, a heater 122 is arranged. Opened inside the space of the casing 114 at a position downstream of the filter 120 is a secondary air induction pipe 134, which has an outside end connected to an air pump 136 for forcible introduction of secondary air into the space inside the casing 114. At the inlet end 116 of the casing 114, a first valve device 140 is arranged, which is constructed by a valve casing 142 defining a first valve seat 142-1 and a second valve seat 142-2, and a valve member 144 arranged in the casing 142. Connected to the space inside the valve casing 142 is a discharge pipe 150. The valve member 144 is arranged inside the casing 142 at a position upstream from the discharge pipe 150 for selectively controlling the flow of the exhaust gas into the valve casing 142. The valve member 144 is of a swing door type capable of rotating about a pivot pin 152 between two positions. The first position is where the first valve seat 142-1 to the exhaust pipe 100 is closed with respect to the filter 122 so that the exhaust gas in the exhaust pipe 100 is introduced into a by-pass pipe 160 for by-passing the particulate trap device 112. The secondary gas from the air pump 136 is thus introduced via the filter 122 to the exhaust gas discharge pipe 150 for preventing the secondary gas for combustion with the particulates held in the filter 122 from being mixed with the exhaust gas in the exhaust pipe 100. The second position is an opened position where the valve member 144 is rotated in a clockwise direction in FIG. 9 about the pin 152 so that the second valve seat 142-2 is closed, which causes the exhaust gas discharge pipe 150 to be closed by the valve member 144, which allows the exhaust gas from the exhaust pipe 100 to be fully introduced into the filter 122.

The by-pass pipe 160 is, at its downstream end, connected to the exhaust pipe at a position downstream from the case 114 of the particulate trapping device 112. A second valve device 170 is provided, which is constructed by a casing 172 having a first valve seat 172-1 and a second valve seat 172-2 and a valve member 174 which is pivotable about a pin 176. The valve member 174 of the second valve device 170 is moved between a first position, where the first port 172-1 to the filter 120 of the trapping device 114 is fully closed, so that the exhaust gas in the by-pass pipe 160 by-passing the trapping device 112 is introducing into an exhaust pipe 180, and a second position, where the valve member 174 is rotated in a counter-clockwise direction in FIG. 9 about the pin 176 for closing the second valve seat 172-2, so that the by-pass pipe 160 is fully closed and the exhaust gas from the filter 120 of the trapping device 112 is discharged into the exhaust pipe 180.

A pressure difference sensor 182 has a first pressure inlet port 182-1 connected via a pressure sensing conduit 184 to the space inside the casing 116 of the particulate trapping device 112 upstream from the filter 120 and a second inlet port 182-2 connected via a pressure sensing conduit 185 to the space inside the casing 116 of the particulate trapping device 112 downstream from the filter 120.

A control circuit 190, such as a microcomputer, is provided and connected to the pressure difference sensor 182. A signal indicative of a difference of the pressure between the space in the casing 116 upstream from the filter 120 and the space in the casing 118 downstream from the filter 120 is introduced. Front this difference, the control circuit 190 determines a timing for commencing the incineration operation of the filter 120, as will be described fully later.

A first actuator 192 such as a rotating motor is connected to the rotation shaft 152 of the valve member 144 of the first valve 140 for operating the first valve device 142. A second actuator 194, also such as a rotating motor, is connected to the rotation shaft 176 of the valve member 174 of the second valve 170 for operating the second valve device 170. A control circuit 196 is provided for operating the secondary air pump 136 for controlling the secondary air introduction operation. The microcomputer 190 is also connected to these actuators and control devices 192, 194, and 196. Control signals for operating the actuators 192 and 194 and the control unit 196 are applied thereto for obtaining the desired operation of the present invention.

Next, the operation of the first embodiment of the present invention will be described. The diesel engine is, for example, one of 3,400 cc and is operated under a full load condition while the engine rotational speed is maintained at 1,400 revolutions per minute. During the usual state, the actuator 192 causes the first valve device 140 to be in a state where the valve 144 opens the valve seat 142-1 and closes the valve seat 142-2. The actuator 194 causes the second valve device 170 to be in a state where the valve 174 opens the valve seat 172-1 and closes the valve seat 172-2. As a result, the flow of the exhaust gas is prevented not only in the exhaust gas discharge pipe 150 but also in the by-pass pipe 160, and a flow of the exhaust gas is created from the exhaust pipe 100, via the filter 120 of the particulate trapping device 112, to the exhaust pipe 180, which causes the particulates in the exhaust gas to be trapped by the filter 120 when the gas passes through the porous walls forming the cells.

The trapping operation of the particulates in the filter 120 causes the flow resistance of the exhaust gas to be increased, so that a pressure difference $\Delta P$ between the inlet and the outlet of the filter 120 becomes higher than a predetermined value. When the pressure difference $\Delta P$ becomes higher than a predetermined value $\Delta P1$ the control circuit 190 issues a signal to the actuator 192 causing the valve 144 of the first valve device 140 close to the valve seat 142-1 and open the valve seat 142-2, and issues a signal to the actuator 194 causing the valve 174 of the second valve device 170 to close to the valve seat 172-1 and open the valve seat 172-2. As a result, the flow of the exhaust gas from the exhaust pipe 160 to the exhaust pipe 180 via the filter 120 is stopped, and the flow of the exhaust gas in the by-pass pipe 160 as shown by an arrow F is obtained. The control circuit 190 issues a signal to the controller 196 causing the air pump 136 to be activated, so that an air flow is introduced via the pipe 134 into the casing 114 at a position downstream from the filter 120. The control circuit 190 also issues a signal to the heater 122 for generating heat which causes the particulates held in the filter 120 to be ignited and burnt. It should be noted that the control circuit 196 controls the amount of the air flow Q from the air pump 136, so as to obtain the value V2 in FIG. 6 giving maximum incineration ratio η1. In this example, the value V2 was 90 liters per minute.

After a predetermined time for the incineration process elapses, the control circuit 196 issues a signal for de-energizing the heater 122 and the pump 86, and the control circuit 190 issues signals to the actuators 192 and 194, which cause the first and second valve devices 142 and 170 to allow exhaust gas from the engine to be passed through the filter 120. It should be noted that, at this state just after the completion of the first incineration process, as shown in FIG. 5, at the outer periphery of the filter, a layer 50 of the particulates remaining without being incinerated is created due to the fact that the heat dissipated from the outer surface to the atmosphere causes the temperature of the outer layer of the filter to be decreased, so that there is a reduction in the effective flow area from the initial value A0 to the value A1.

Just after the completion of the first incineration operation of a new filter 120, the heater 122 is de-energized, and the control of the control circuit 196 is continued for supplying the same amount of air flow Q of 90 liters per minute from the pipe 134 in which the valves 140 and 170 are at their positions for the incineration operation. A pressure loss difference ΔP is detected by the sensor 182, from which the remaining particulate ratio a can be calculated from a relationship between the pressure difference ΔP and the nonburnt ratio a of the particulates as shown in FIG. 7. As will be easily seen from FIG. 7, the higher the pressure difference ΔP, the higher the remaining particulate ratio a, which corresponds to a ratio of the area with no particulates remaining (diameter A1 in FIG. 5) to the initial area of the filter (diameter A0 in FIG. 5). FIG. 8 shows the relationship between the remaining particulate ratio a and the amount of the air Q for obtaining the air speed V2 for obtaining the maximum incineration ratio η1 (FIG. 6). FIG. 9 shows that the higher the remaining particulate ratio a, i.e., the smaller the area A1 in FIG. 5, the smaller the amount of the secondary air flow from the air pump 136. From this relationship, a desired amount Q of the secondary air for the following incineration process can be known.

After the amount of the secondary air for the next incineration process is determined after the completion of the preceding incineration process, the valves 140 and 170 are moved to the usual positions where the valve port 142-1 is opened, and the valve port 172-1 is opened for allowing the introduction of the exhaust gas to the filter 120 for trapping the particulates. When the predetermined pressure difference ΔP1 is obtained, the incineration process is commenced, wherein the secondary air amount for obtaining the desired air speed V2 for obtaining the maximum incineration ratio η1 is used.

In the prior art, the amount of the air for incineration is maintained unchanged even in the second or later cycles, which causes the flow speed to be increased due to the existence of the area 50 in FIG. 5, causing the incineration ratio η to be worsened, as will be seen from FIG. 4. According to this embodiment, at the second or later incineration process, the amount of the secondary air is changed to maintain the desired air speed V2 for the maximum incineration ratio η1. For the third and later incinerating processes, before operating the heater 122, the pump 136 is operated for issuing the same amount of air as at the first time, and the pressure difference is detected for obtaining the optimum air amount Q for the desirable incineration ratio η1.

Figure 10:
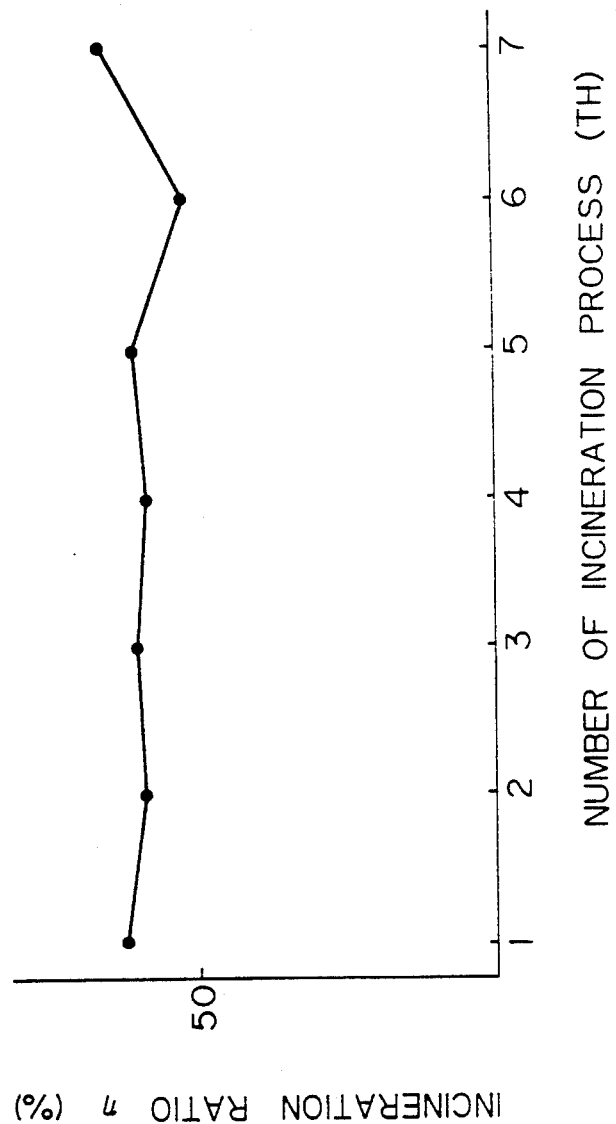
FIG. 10 shows the relationship between the number of incineration processes and a incineration ratio in the present invention.

FIG. 10 illustrates the relationship of the incineration ratio with the number of incineration processes. The adjustment of the secondary air according to the present invention for obtaining the optimum air speed can prevent a decrease in the incineration ratio even in the case where the process repeated more than seven times.

Figure 9:
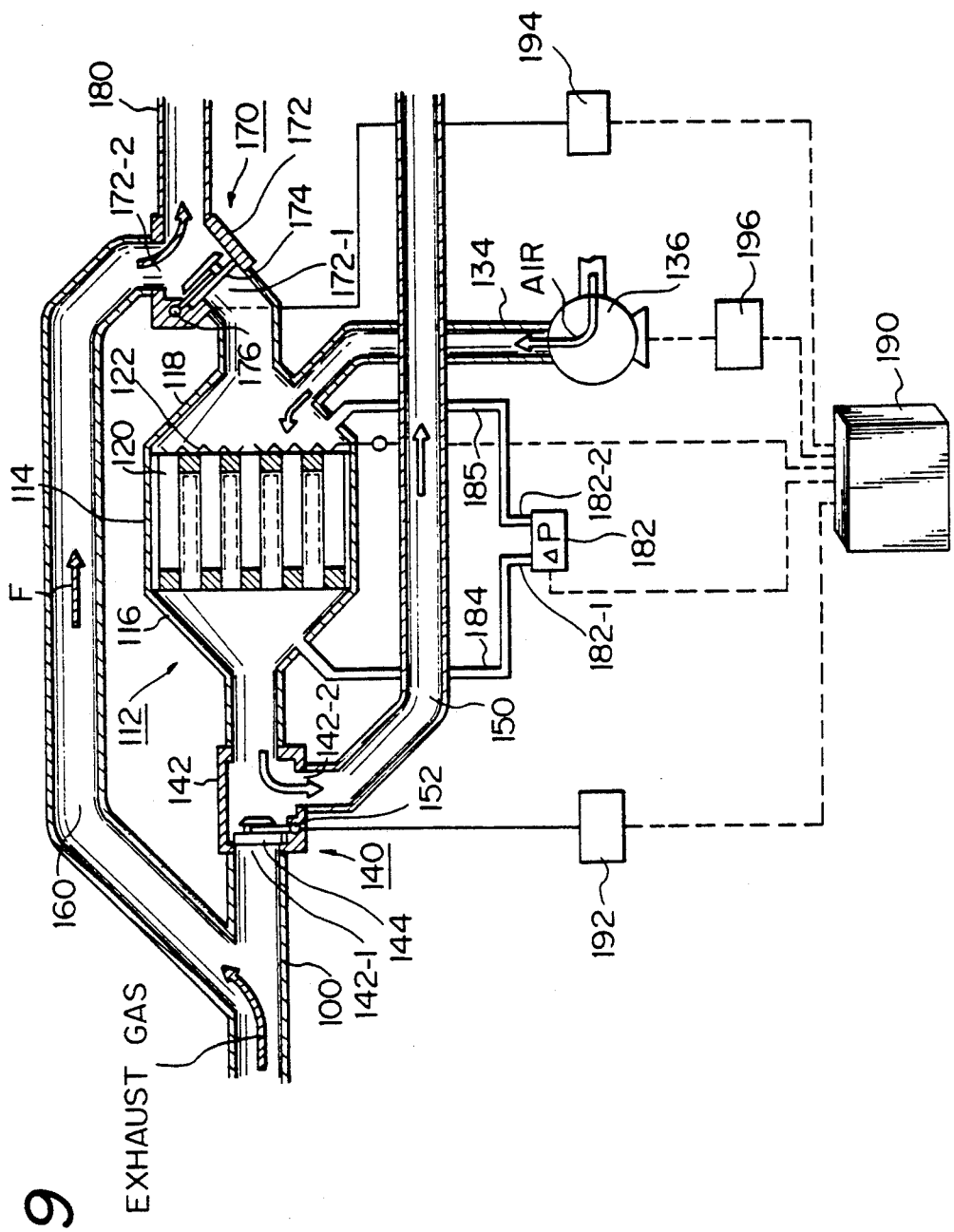
FIG. 9 shows a device according to the present invention.
Figure 11:
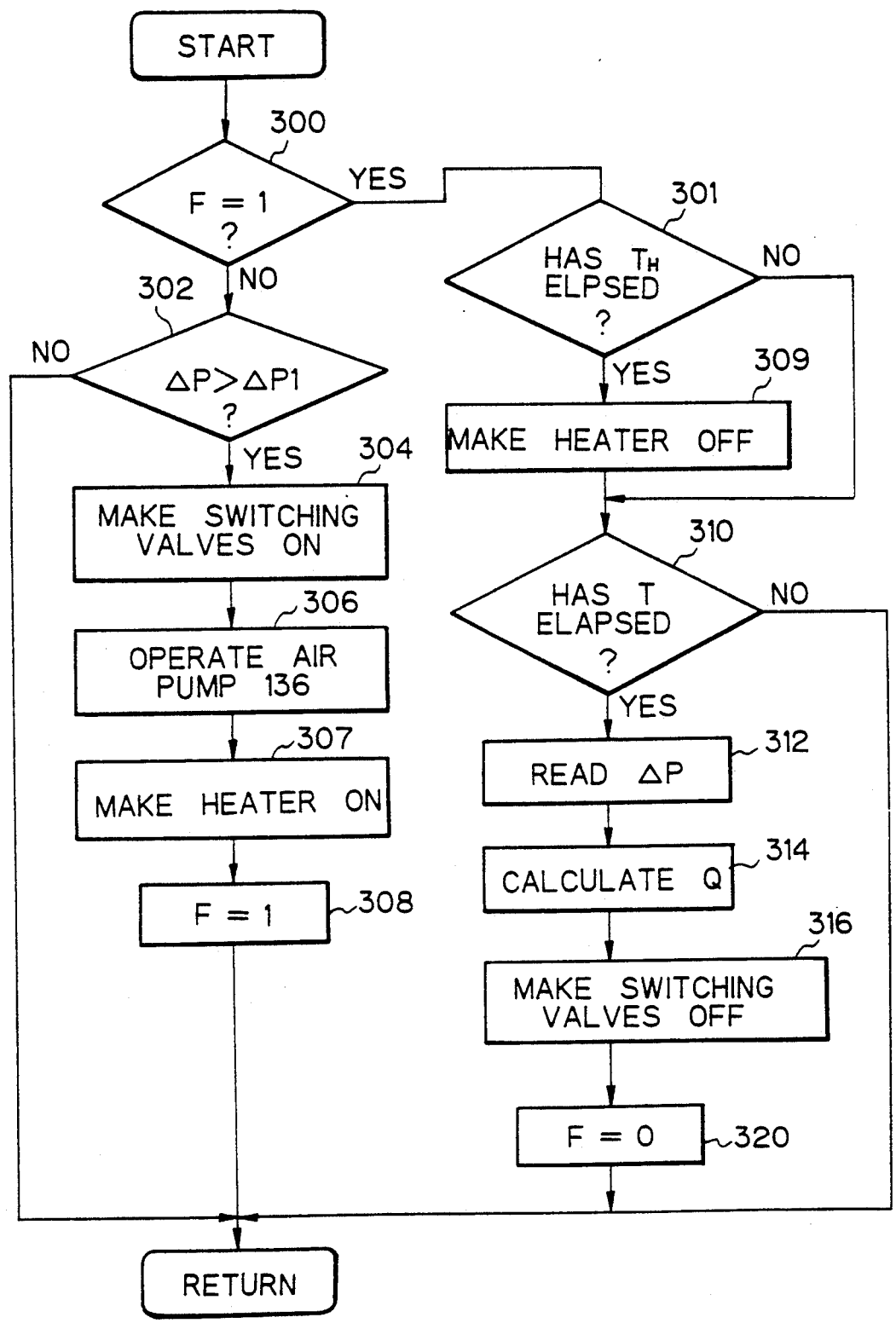
FIG. 11 is a flowchart for obtaining incineration in a first embodiment of the present invention.

FIG. 11 is a flowchart illustrating an example of a program stored in the control 190 in FIG. 9 for attaining its designated operation The routine in FIG. 11 is repeated every predetermined time, for example, 50 milliseconds. At step 300, it is determined if a flag F is set (1), which flag is reset (0) when an incineration process is completed. Usually, the routine goes to step 302, where it is determined if the pressure difference ΔP as detected by the sensor 182 is larger than a predetermined threshold value ΔP1 for commencing an incineration process. When it is determined that the ΔP ≦ ΔP1, it is decided that filter 120 is not yet clogged. Then, routine below 302 is by-passed, which allows the valves 140 and 170 to be situated to allow an exhaust gas from the engine to be introduced into the filter 120.

When it is determined that ΔP > ΔP1, it is decided that the filter 120 is clogged. Then, the routine goes to step 304, where signals are issued to the switching valves 140 and 170 to position so that the exhaust gas is diverted into the by-pass pipe 160, causing the exhaust gas to by-pass the filter 120. Then, at step 306, a signal is issued to the controller 196, for causing the air pump 136 to be operated for a period for introducing a desired amount Q (90 liters per second if the first incineration process) of secondary air into the trapping device 112 via the pipe 134. At the step 307, the heater 122 is turned ON and then at step 308, the flag F is set (1).

When the routine in FIG. 11 is again executed after the elapse of 50 milliseconds, a positive determination is obtained at step 300, and then the routine goes to step 301, where it is determined if a predetermined time $T_h$ for operating the heater 122 has elaped. When a "yes" result is obtained the routine goes to step 309 for de-energizing the heater 122. In other words, the heater 122 is turned ON for a time period of $T_h$ after the commencement of an instant incineration process. Then, the routine goes to step 310, where it is determined if a predetermined time $T(T_h)$ for completing a single incineration process has elapsed. Initially, a no determination is naturally obtained, and the incineration process is continued.

When the predetermined time T has passed from the beginning of the incineration process, the routine goes via steps 312 and 314 to step 316, where the valves 140 and 170 are switched so that the diversion of the exhaust gas to the by-pass pipe 160 is stopped and the exhaust gas is introduced into the filter 120 for re-starting the particulate trapping operation. At step 320, the flag F is cleared. The steps 312 and 314 are for determination of the air amount for the following incineration cycle according to the present invention. At step 312, a pressure drop ΔP is read out while introducing same amount of air as the first time, and at step 314, an air flow amount Q is calculated for obtaining the maximum incineration efficiency. Namely, at first, a remaining particulate ratio a is calculated from a map shown in FIG. 7, and then the air amount Q corresponding to the obtained ratio a is calculated from a map shown FIG. 8.

After the completion of the first incineration process, the particulates clogged in the filter 120 are removed and therefore a desired particulate removing efficiency by the filter 120 is achieved. The filter 120 continues its trapping operation so long as a condition of $\Delta P \leq \Delta P1$ at step 302 is maintained.

When a condition of $\Delta P > \Delta P1$ is again obtained due to the clogging of the particulates in the filter 120, the steps 304 to 308 are again executed. FIG. 10 shows the number of incineration cycles and the incineration ratio $\eta$. As is easily seen therefrom, an incineration ratio $\eta$ larger than 50 percent is obtained even after seven incineration processes due to the fact that the amount Q of the air flow in the incineration process is controlled for obtaining a desired speed of the air flow to obtain the maximum incineration ratio $\eta1$.

Figure 12:
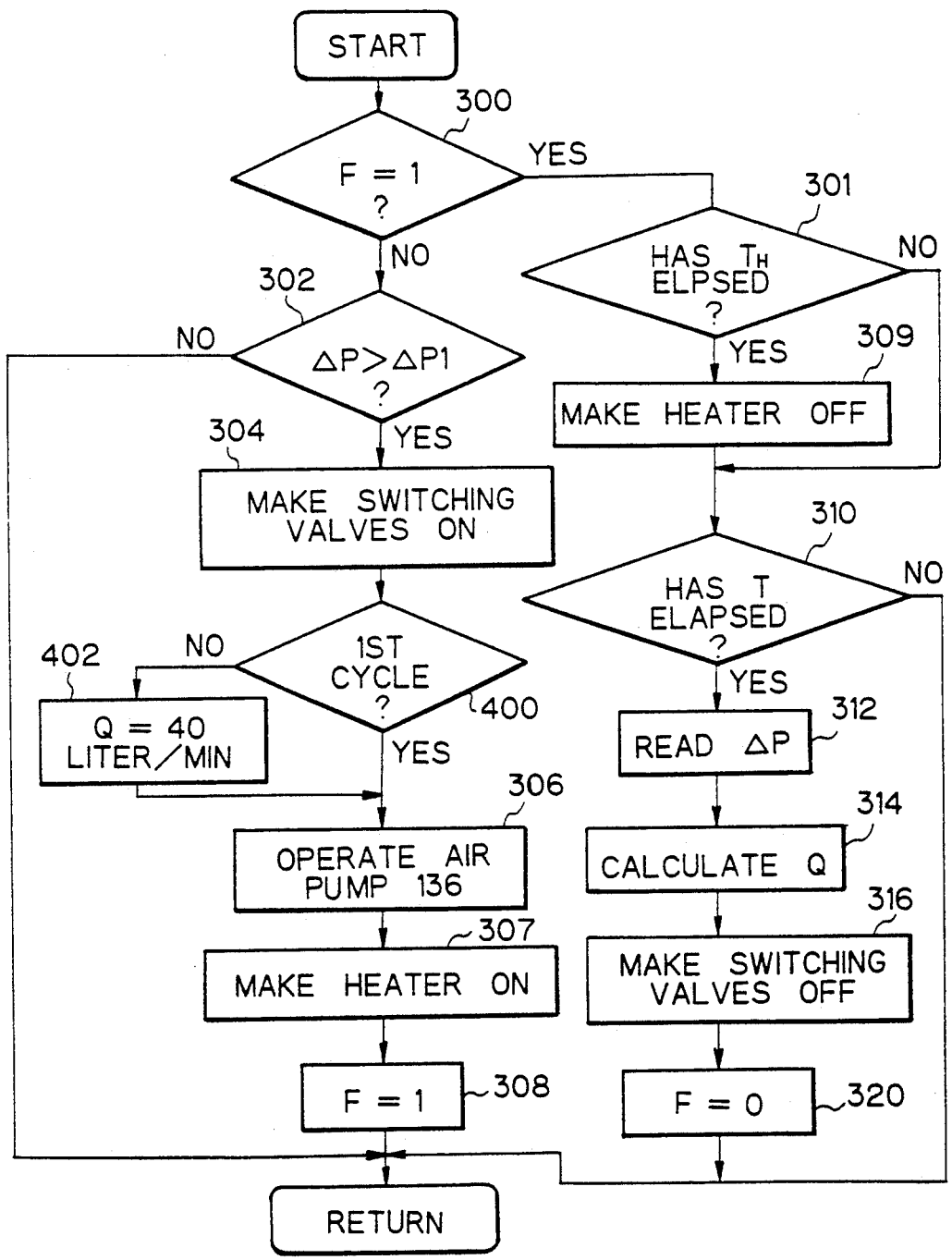
FIG. 12 shows a flowchart for obtaining incinerations in a second embodiment.
Figure 13:
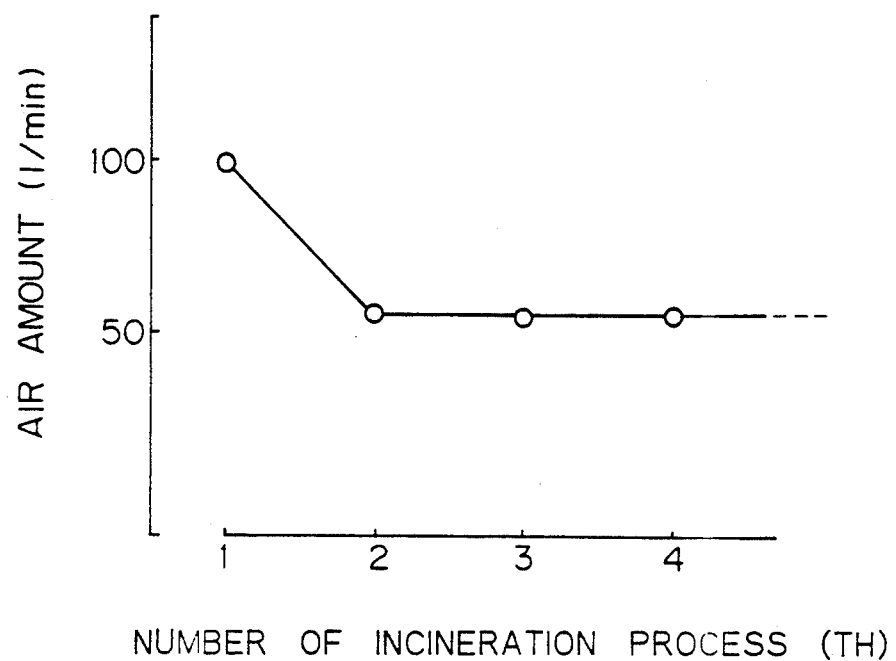
FIG. 13 shows the relationship between the number of incineration processes and the setting of an amount of air for the incineration processes in the second embodiment shown in FIG. 12.

FIG. 12 is a flowchart of a second embodiment, which is different from the first embodiment in FIG. 11 regarding the value of the air flow amount during the second and later incineration cycles. In this embodiment, when a condition of $\Delta P > \Delta P1$ is obtained at step 302, the routine goes to step 304 for energizing the valves 140 and 170 and to step 400 where it is determined if this is the first incineration process. When it is the initial process, the routine goes to the step 306, the same as in FIG. 11, for operating the air pump 136 for obtaining the initial amount Q of air of 90 liters/min. When it is determined that it is a second or later process, the routine goes to a step 402 for obtaining the initial amount Q of air of 40 liters/min. Namely, in the second embodiment, as shown in FIG. 13, the amount of the air flow in the second incineration cycle is fixed. As explained with reference to FIG. 5, in the first embodiment, the effective area after the initial incineration process is reduced to A1, which means that the remaining particulate ratio a is, for example, 60 percent, from FIG. 7. Then, it is determined from FIG. 8 that the amount of Q =40 liters/min. is, for example, suitable for obtaining the air flow speed V2 for obtaining the maximum incineration ratio $\eta1$. The value of Q =40 is considered to be sufficient to obtain a desired incineration condition during the third and later cycles since the state of the thickness of the outer nonincinerated layer 50 with the effective diameter of A1 just after incineration cycles is considered to be maintained substantially unchanged. This second embodiment is advantageous in that the logical construction is simplified.

Figure 14:
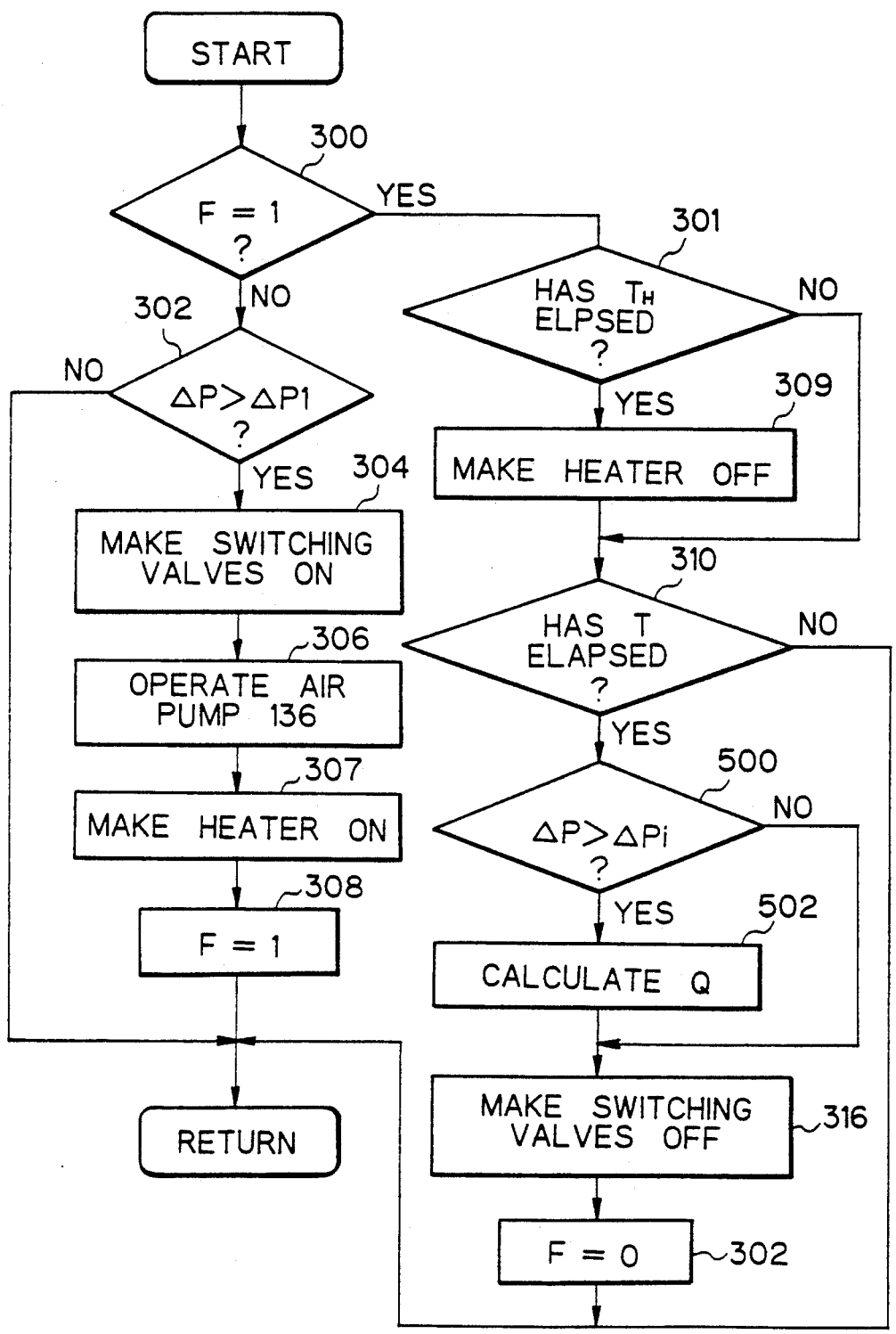
FIG. 14 is a flowchart for obtaining incineration in a third embodiment of the present invention.

FIG. 14 is a flowchart of a third embodiment. This embodiment is different from the flowchart in FIG. 11 (the first embodiment) in that steps 500 and 502 are provided in place of steps 312 and 314 in FIG. 11. At the end of the second or later incineration cycle, at step 500 it is determined if the pressure loss $\Delta P$ across the filter in the direction of the flow of the air in the filter is larger than a lowest limit $\Delta Pi$. When it is determined that $\Delta P > \Delta Pi$, then at step 502, the air amount Q is calculated based on the relationship in FIGS. 7 and 8, as similar to step 312 in FIG. 11. This means that the pressure loss across the filter in the direction of the air flow therein is always maintained smaller than the predetermined value $\Delta Pi$. This embodiment is advantageous in that the control logic is simplified.

In the above embodiments, the timing for commencement of the incineration process is determined by the pressure difference across the filter in the direction of the air flow. However, in place of this, the timing can be determined from the engine speed or the accumulated running time.

Although embodiments of the present invention were described with reference to the attached drawings, many modifications and changes can be made by those skilled in this art without departing from the scope and spirit of the invention.

We claim:

1. A device for removing particulates in an exhaust gas in a diesel engine, said device comprising;
    a filter adapted to be disposed in an exhaust line for receiving said exhaust gas from said diesel engine and trapping said particulates included in said exhaust gas;
    heating means arranged adjacent to said filter for generating heat in said filter;
    means for supplying air into aid filter for incinerating said particulates; and
    means for controlling an amount of air flow for obtaining a desired incineration performance of said particulates trapped in said filter;
    wherein said air flow amount controlling means includes means for detection of a number of repetitions of an incineration process, and means for varying said air flow amount in accordance with said number of the repetitions of said incineration process.

2. A device for purifying particulates in an exhaust gas in a diesel engine, said device comprising;
    a filter adapted to be disposed in an exhaust line for receiving said exhaust gas from said diesel engine and trapping said particulates included in said exhaust gas;
    means for detecting an effective area of said filter before trapping of said particulates by said filter commences;
    means for determining an amount of air introduced into said filter for an incineration process, said determining means comprising:
        i.) a map having data of a speed of air flow with respect to a value of said effective area; and
        ii.) map calculation means for obtaining said desired air amount, from said detected value of the effective area and said map;
    means for detecting when a sufficient amount of said particulates is trapped by said filter;
    heating means arranged adjacent to said filter for generating heat in said filter; and
    means for supplying said determined amount of air into said filter for said incineration process.

3. A device for purifying particulates in exhaust gas in a diesel engine, said device comprising:
    a filter arranged in an exhaust line for receiving the exhaust gas from the diesel engine, the filter being capable of trapping particulates included in the exhaust gas;
    heating means arranged adjacent to the filter for generating heat in the filter;
    a by-pass pipe connected to the exhaust line for by-passing the filter;
    valve means for switching between a first condition where the exhaust gas is passed through the filter without passing through the by-pass pipe and a second condition where the exhaust gas is passed through the by-pass pipe without passing through the filter, the valve means being usually in its first condition for trapping the particulates in the exhaust gas;
    means connected to the filter for introducing a forced flow of air for incineration of the particulates in the filter;

means for detection of the clogged state of the filter by which a incineration process of the filter is required;

means, responsive to the detection of the clogging state, for commencing the incineration process by operating the valve means to take its second condition for by-passing the filter and by operating the heater means, and said forced flow introducing means;

means, upon the end of the incineration process, for determining a value of an effective flow area of the filter of the exhaust gas; and means for determining the amount of the air introduced into the filter for the incineration process in accordance with the detected value of the effective area before commencement of a new trapping in such a manner that a speed of the air passed through the filter to obtain a desired particulate trapping performance is obtained.

4. A device according to claim 3, wherein the amount of the air for the second and later incineration processes is fixed to a predetermined constant value.

5. A device according to claim 3, wherein said heating means is arranged downstream of the filter, and wherein said means for introduction of the air for incineration is opened to the downstream side of the filter.

6. A device according to claim 3, wherein said clogging detection means includes a means for detection of a pressure difference across the filter in the direction of the flow of the exhaust gas and a means for determining if the detected pressure difference is higher than a predetermined value for determining the necessity of the incineration process.

7. A device according to claim 3, further comprising detecting means for detection of a pressure difference across the filter in the direction of the flow of the exhaust gas upon the completion of a incineration cycle and means for allowing the determination of the amount of the air by said determining means when the value of the pressure difference detected by the second detecting means is larger than a predetermined value.

* * * * *